US012810710B2

(12) United States Patent
Tatsumoto et al.

(10) Patent No.: US 12,810,710 B2
(45) Date of Patent: Nov. 24, 2026

(54) INFORMATION PRESENTATION APPARATUS AND VEHICLE

(71) Applicant: TOYOTA JIDOSHA KABUSHIKI KAISHA, Toyota (JP)

(72) Inventors: Yuki Tatsumoto, Seto (JP); Josuke Yamane, Nagoya (JP); Hirotaka Nogami, Nisshin (JP); Kazuya Nishimura, Anjo (JP); Takumi Fukunaga, Iwakura (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 13 days.

(21) Appl. No.: 18/974,790

(22) Filed: Dec. 10, 2024

(65) Prior Publication Data

US 2025/0201096 A1 Jun. 19, 2025

(30) Foreign Application Priority Data

Dec. 15, 2023 (JP) ................................ 2023-212504

(51) Int. Cl.
*G08B 21/02* (2006.01)

(52) U.S. Cl.
CPC .................................... *G08B 21/02* (2013.01)

(58) Field of Classification Search
CPC ........ G08B 21/02; G08B 21/24; G08B 21/22; B60Q 1/544; B60Q 5/005; B60Q 9/00; B60R 25/20
See application file for complete search history.

(56) References Cited

U.S. PATENT DOCUMENTS

| | | | | |
|---|---|---|---|---|
| 2003/0052538 | A1* | 3/2003 | Lorenz | E05B 77/26 307/10.1 |
| 2003/0122662 | A1* | 7/2003 | Quinonez | B60N 2/267 340/457 |
| 2006/0103516 | A1* | 5/2006 | Zang | G08B 21/24 340/457 |
| 2010/0235057 | A1* | 9/2010 | Papanikolaou | E05B 81/14 701/49 |
| 2016/0355128 | A1* | 12/2016 | Konchan | E05B 81/72 |
| 2016/0379466 | A1* | 12/2016 | Payant | B60N 2/267 340/457 |
| 2017/0074008 | A1* | 3/2017 | Marlia | E05B 81/58 |
| 2018/0065504 | A1* | 3/2018 | Lan | B60N 2/0021 |
| 2018/0126872 | A1* | 5/2018 | Folino | G08B 21/22 |
| 2021/0245771 | A1* | 8/2021 | Golov | G06N 3/0464 |
| 2022/0379898 | A1* | 12/2022 | Kawamura | B60W 40/08 |

FOREIGN PATENT DOCUMENTS

JP 2006062622 A 3/2006

* cited by examiner

*Primary Examiner* — Ryan W Sherwin
(74) *Attorney, Agent, or Firm* — KENJA IP LAW PC

(57) ABSTRACT

An information presentation apparatus includes an output interface installed inside a vehicle, and a controller configured to determine whether a person is trapped inside the vehicle when a door of the vehicle is locked by a locking operation outside the vehicle, and present, upon determining that a person is trapped inside the vehicle, information indicating procedures for unlocking and opening the door via the output interface.

5 Claims, 3 Drawing Sheets

INFORMATION PRESENTATION APPARATUS AND VEHICLE

CROSS-REFERENCE TO RELATED APPLICATION

This application claims priority to Japanese Patent Application No. 2023-212504 filed on Dec. 15, 2023, the entire contents of which are incorporated herein by reference.

TECHNICAL FIELD

The present disclosure relates to an information presentation apparatus and a vehicle.

BACKGROUND

Patent Literature (PTL) 1 discloses a keyless entry system that notifies a mobile terminal that a person is on board if a person is on board when an operation to lock the doors of a vehicle is performed by the mobile terminal.

CITATION LIST

Patent Literature

PTL 1: JP 2006-062622 A

SUMMARY

If a person is trapped inside a vehicle, simply notifying the driver's mobile terminal is not always sufficient. For example, the driver may not be aware of the notification, or the unlocking operation may not be possible due to a dead battery in the mobile terminal. Therefore, it is desirable for the trapped person to unlock and open the door on his/her own, but children or the elderly may not know how to unlock or open the door.

It would be helpful to enable a person trapped inside a vehicle to unlock and open the door on his/her own.

An information presentation apparatus according to the present disclosure includes:

an output interface installed inside a vehicle; and a controller configured to:

- determine whether a person is trapped inside the vehicle when a door of the vehicle is locked by a locking operation outside the vehicle; and
- present, upon determining that a person is trapped inside the vehicle, information indicating procedures for unlocking and opening the door via the output interface.

According to the present disclosure, a person trapped inside a vehicle can unlock and open the door on his/her own.

DETAILED DESCRIPTION

Figure 1:
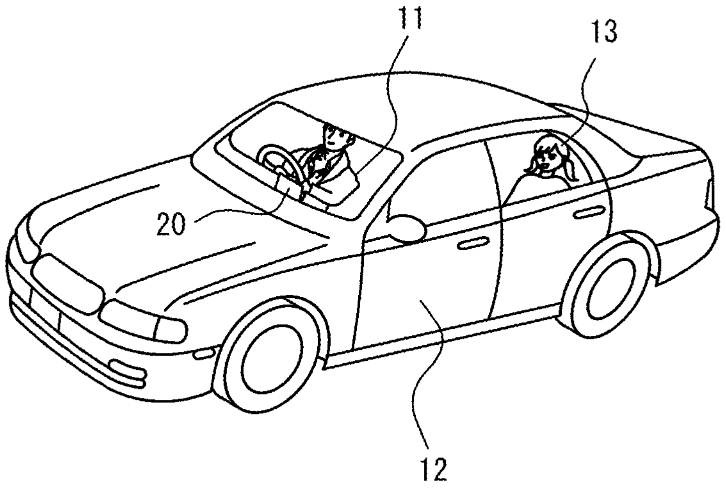
FIG. 1 is a diagram illustrating an example of a vehicle including an information presentation apparatus according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

An outline of the present embodiment will be described with reference to FIG. 1.

The information presentation apparatus 20 is a computer installed in a vehicle 12. That is, the information presentation apparatus 20 is included in the vehicle 12.

The vehicle 12 is, for example, any type of automobile such as a gasoline vehicle, a diesel vehicle, a hydrogen vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. The vehicle 12, which is driven by a driver 11 in the present embodiment, may be automated at any level. The automation level is, for example, any one of Level 1 to Level 5 according to the level classification defined by SAE. The name "SAE" is an abbreviation of Society of Automotive Engineers. The vehicle 12 may be a MaaS-dedicated vehicle. The term "MaaS" is an abbreviation of Mobility as a Service.

The information presentation apparatus 20 determines whether a person is present in the vehicle 12, i.e., whether a person is trapped inside the vehicle 12, in response to a locking operation outside the vehicle 12, which may include locking the vehicle 12 in. The information presentation apparatus 20 notifies, upon determining that a person is trapped inside the vehicle 12, the trapped person via a display or speaker inside the vehicle 12 of the procedures for unlocking and opening the door.

According to the present embodiment, a person trapped inside the vehicle 12 is notified of the procedures for unlocking and opening the door, which increases the probability that the person can unlock and open the door on his or her own and escape from the vehicle 12.

If the information presentation apparatus 20 determines that a person is trapped inside the vehicle 12, it may initiate a call between the mobile terminal of the driver 11 and the information presentation apparatus 20. The call may be a voice call or a video call. If the information presentation apparatus 20 determines that the trapped person is a child 13, it may initiate a call between the mobile terminal of the parent of the child 13 and the information presentation apparatus 20, other than the driver 11.

If the information presentation apparatus 20 determines that the trapped person is a child 13, the procedure for unlocking or opening the door may be simpler than normal. For example, the information presentation apparatus 20 may modify the procedure so that unlocking and opening the door are simultaneously performed by operating only the inner handle of the door.

If the information presentation apparatus 20 determines that a person is trapped inside the vehicle 12, it may output an alarm to the outside of the vehicle 12. For example, the information presentation apparatus 20 may collect audio from inside the vehicle 12 via a microphone inside the vehicle 12 and output it from a speaker outside the vehicle 12. Alternatively, the information presentation apparatus 20 may activate the hazard lights or horn of the vehicle 12.

Alternatively, the information presentation apparatus 20 may display a message on a display outside the vehicle 12 indicating that a person is trapped inside the vehicle 12. The information presentation apparatus 20 may output an alarm to the outside of the vehicle 12 when it is determined to be dangerous based on, among other things, the temperature inside the vehicle 12, the remaining battery power in the vehicle 12, or the air conditioning of the vehicle 12.

Figure 2:
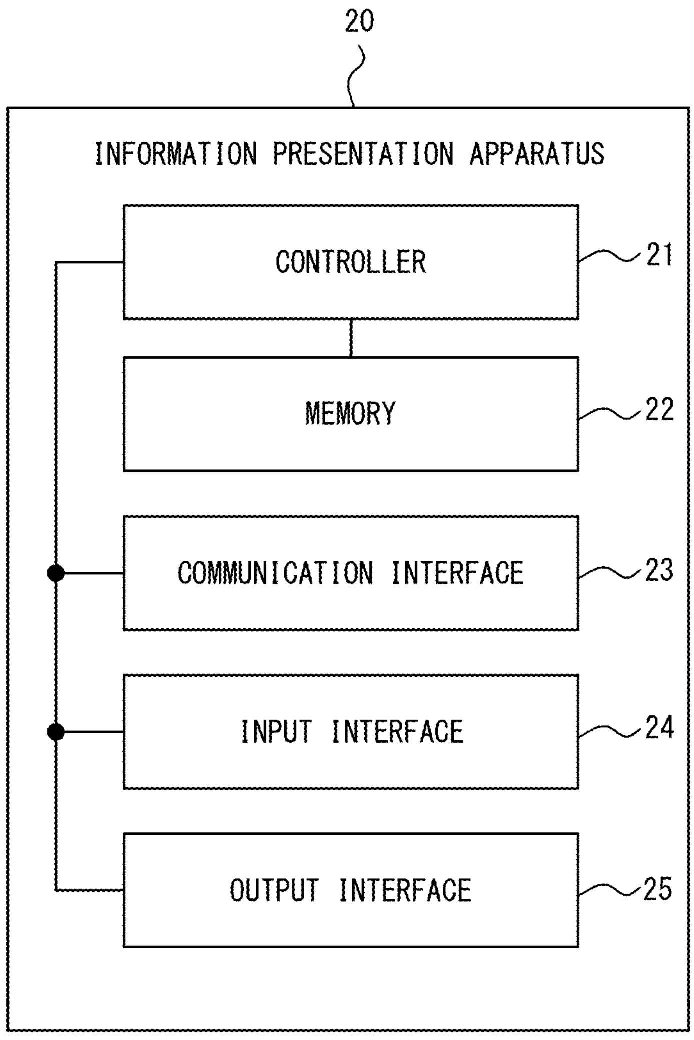
FIG. 2 is a block diagram illustrating a configuration of the information presentation apparatus according to the embodiment of the present disclosure.

A configuration of the information presentation apparatus 20 according to the present embodiment will be described with reference to FIG. 2.

The information presentation apparatus 20 includes a controller 21, a memory 22, a communication interface 23, an input interface 24, and an output interface 25.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the information presentation apparatus 20 while controlling components of the information presentation apparatus 20.

The memory 22 includes at least one semiconductor memory, at least one magnetic memory, at least one optical memory, or any combination thereof. The semiconductor memory is, for example, RAM, ROM, or flash memory. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The flash memory is, for example, SSD. The term "SSD" is an abbreviation of solid-state drive. The magnetic memory is, for example, HDD. The term "HDD" is an abbreviation of hard disk drive. The memory 22 functions as, for example, a main memory, an auxiliary memory, or a cache memory. The memory 22 stores information to be used for the operations of the information presentation apparatus 20 and information obtained by the operations of the information presentation apparatus 20.

The communication interface 23 includes at least one communication module. The communication module is, for example, a module compatible with a mobile communication standard such as LTE, the 4G standard, or the 5G standard, or a wireless LAN communication standard such as IEEE 802.11. The term "LTE" is an abbreviation of Long Term Evolution. The term "4G" is an abbreviation of 4th generation. The term "5G" is an abbreviation of 5th generation. The name "IEEE" is an abbreviation of Institute of Electrical and Electronics Engineers. The communication interface 23 communicates with the mobile terminal of the driver 11, such as a smart key, mobile phone, smartphone, or tablet, via a network such as the Internet. The communication interface 23 receives information to be used for the operations of the information presentation apparatus 20, and transmits information obtained by the operations of the information presentation apparatus 20.

The input interface 24 includes at least one input device. The input device is, for example, a physical key, a capacitive key, a pointing device, a touch screen integrally provided with a display, a visible light camera, a depth camera, a LiDAR sensor, or a microphone. The term "LiDAR" is an abbreviation of light detection and ranging. The input interface 24 accepts an operation for inputting information to be used for the operations of the information presentation apparatus 20. The input interface 24, instead of being included in the information presentation apparatus 20, may be connected to the information presentation apparatus 20 as an external input device. As an interface for connection, an interface compliant with a standard such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 25 is installed inside the vehicle 12. The output interface 25 includes at least one output device. The output device is, for example, a display or a speaker. The display is, for example, an LCD or an organic EL display. The term "LCD" is an abbreviation of liquid crystal display. The term "EL" is an abbreviation of electro luminescent. The output interface 25 outputs information obtained by the operations of the information presentation apparatus 20. The output interface 25, instead of being included in the information presentation apparatus 20, may be connected to the information presentation apparatus 20 as an external output device such as a display audio. As an interface for connection, an interface compliant with a standard such as USB, HDMI®, or Bluetooth® can be used.

The functions of the information presentation apparatus 20 are realized by execution of a program according to the present embodiment by a processor serving as the controller 21. That is, the functions of the information presentation apparatus 20 are realized by software. The program causes a computer to execute the operations of the information presentation apparatus 20, thereby causing the computer to function as the information presentation apparatus 20. That is, the computer executes the operations of the information presentation apparatus 20 in accordance with the program to thereby function as the information presentation apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, the program stored in the portable medium or the program transferred from the server. Then, the computer reads the program stored in the main memory using the processor, and executes processes in accordance with the read program using the processor. The computer may read the program directly from the portable medium, and execute processes in accordance with the program. The computer may, each time a program is transferred from the server to the computer, sequentially execute processes in accordance with the received program. Instead of transferring the program from the server to the computer, processes may be executed by a so-called ASP type service that realizes functions only by execution instructions and result acquisitions. The term "ASP" is an abbreviation of application service provider. The program encompasses information that is to be used for processing by an electronic computer and is thus equivalent to a program. For example, data that is not a direct command to a computer but has a property that regulates processing of the computer is "equivalent to a program" in this context.

Some or all of the functions of the information presentation apparatus 20 may be realized by a programmable circuit or a dedicated circuit serving as the controller 21. That is, some or all of the functions of the information presentation apparatus 20 may be realized by hardware.

Operations of the information presentation apparatus 20 according to the present embodiment will be described with reference to FIG. 3. The operations described below correspond to an information presentation method according to the present embodiment. In other words, the information presentation method according to the present embodiment includes steps S1 to S6 illustrated in FIG. 3.

Step S1 is initiated when the doors of the vehicle 12 are locked by a locking operation outside the vehicle 12. The locking operation may be performed by the driver 11 using a key to lock the door in the vicinity of the vehicle 12, or by the driver 11 remotely locking the door using a mobile terminal.

In S1, the controller 21 determines whether a person is trapped inside the vehicle 12. Specifically, the controller 21 uses an in-vehicle camera or seating sensor to determine whether a person is seated in a seat, such as a passenger seat or rear seat, in the vehicle 12. The controller 21 may further determine with an in-vehicle camera whether a person is present in a space, such as the floor or cargo area, of the vehicle 12.

When it is determined in S1 that a person is trapped inside the vehicle 12, step S2 is performed. On the other hand, when it is determined in S1 that no person is trapped inside the vehicle 12, the flow illustrated in FIG. 3 ends.

In S2, the controller 21 presents information indicating the procedures for unlocking and opening the door via the output interface 25. Specifically, the controller 21 displays a message on the in-vehicle display or outputs an audio message from the in-vehicle speaker explaining the procedures for unlocking and opening the door. Alternatively, the controller 21 may play a video through the in-vehicle display and in-vehicle speakers explaining the procedures for unlocking and opening the door.

If the controller 21 determines that the trapped person is a child 13, the controller 21 may make the procedure for unlocking or opening the door simpler than normal. In such cases, the controller 21 presents information indicating the procedure made simpler via the output interface 25.

In S3, the controller 21 determines whether the door was unlocked and opened as a result of step S2. Specifically, the controller 21 uses the door sensor to determine whether any one door of the vehicle 12 has been unlocked and opened. The controller 21 may further determine with an in-vehicle camera or seating sensor whether the trapped person has escaped from the vehicle 12.

Figure 3:
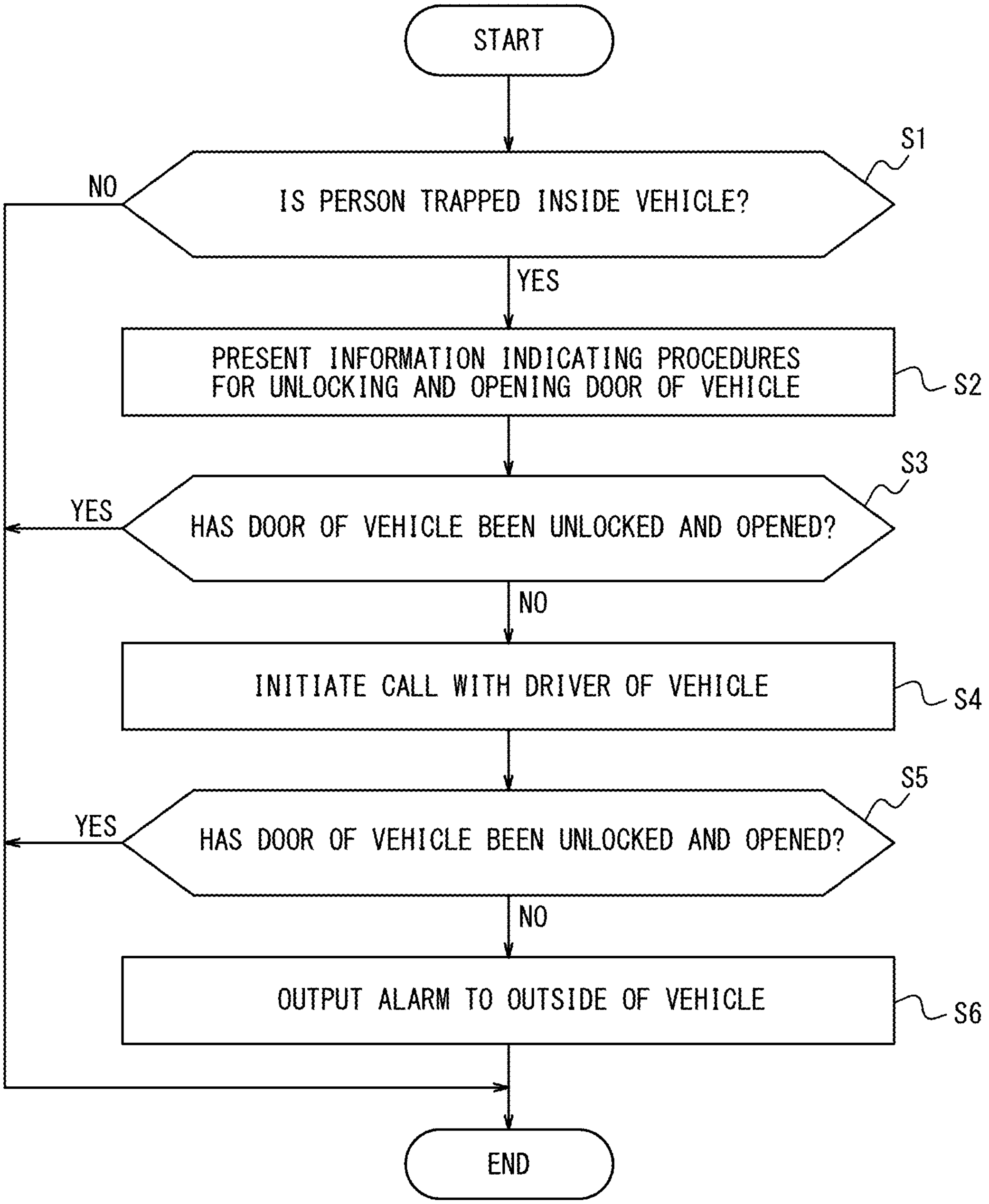
FIG. 3 is a flowchart illustrating operations of the information presentation apparatus according to the embodiment of the present disclosure.

When it is determined in S3 that the door has been unlocked and opened, the flow illustrated in FIG. 3 ends. On the other hand, when it is determined in S3 that the door has not been unlocked or opened, step S4 is performed. Alternatively, step S4 may also be performed if it is determined in S3 that the door has been unlocked and opened but the trapped person has not escaped from the vehicle 12.

In S4, the controller 21 initiates a call with the driver 11 via the communication interface 23. If the controller 21 determines that the trapped person is a child 13, it may initiate a call with the parent of the child 13, other than the driver 11, via the communication interface 23.

In S5, the controller 21 determines whether the door has been unlocked and opened as a result of step S4. Specifically, the controller 21 uses the door sensor to determine whether any one door of the vehicle 12 has been unlocked and opened. The controller 21 may further determine with an in-vehicle camera or seating sensor whether the trapped person has escaped from the vehicle 12.

When it is determined in S5 that the door has been unlocked and opened, the flow illustrated in FIG. 3 ends. On the other hand, when it is determined in S5 that the door has not been unlocked or opened, step S6 is performed. Alternatively, step S6 may also be performed if it is determined in S5 that the door has been unlocked and opened but the trapped person has not escaped from the vehicle 12.

In S6, the controller 21 outputs an alarm to the outside of the vehicle 12. Specifically, the controller 21 displays a message on the exterior display or outputs an audio message from the exterior loudspeaker to inform the user that a person is trapped inside the vehicle 12. If the temperature inside the vehicle 12 exceeds the threshold value, the controller 21 may further display a message on the exterior display or further output an audio message from the exterior loudspeaker to warn of the danger.

Steps S3 and S4 may be performed after steps S5 and S6. Steps S3 and S4 may be omitted. Steps S5 and S6 may be omitted.

The present disclosure is not limited to the embodiment described above. For example, two or more blocks described in the block diagram may be integrated, or a block may be divided. Instead of executing two or more steps described in the flowchart in chronological order in accordance with the description, the steps may be executed in parallel or in a different order according to the processing capability of the apparatus that executes each step, or as required. Other modifications can be made without departing from the spirit of the present disclosure.

The invention claimed is:

1. An information presentation apparatus comprising:

an output interface installed inside a vehicle; and a controller configured to:

determine whether a person is trapped inside the vehicle when a door of the vehicle is locked by a locking operation outside the vehicle;

present, upon determining that a person is trapped inside the vehicle, information indicating first procedures for unlocking and opening the door via the output interface; and upon determining that the person trapped inside the vehicle is a child, change the first procedures to second procedures for unlocking and opening the door and present information indicating the second procedures instead of the first procedures via the output interface, the second procedures requiring at least one fewer operation than the first procedures.

2. The information presentation apparatus according to claim 1, further comprising a communication interface configured to communicate with a mobile terminal of a driver of the vehicle, wherein the controller is configured to initiate a call with the driver via the communication interface upon determining that a person is trapped inside the vehicle.

3. The information presentation apparatus according to claim 1, wherein the controller is configured to output an alarm to outside of the vehicle upon determining that a person is trapped inside the vehicle.

4. The information presentation apparatus according to claim 1, wherein in the second procedures, unlocking and opening the door are simultaneously performed by operating only an inner handle of the door.

5. A vehicle comprising the information presentation apparatus according to claim 1.

* * * * *